United States Patent [19]

Zanoli et al.

[11] Patent Number: 5,023,218

[45] Date of Patent: Jun. 11, 1991

[54] FUSED AND CAST REFRACTORY PRODUCTS HAVING A HIGH ZIRCONIUM DIOXIDE CONTENT

[75] Inventors: Alain P. B. Zanoli, Morieres; Emmanuel J. Sertain, Avignon, both of France

[73] Assignee: Societe Europeenne des Produits, Courbevoie, France

[21] Appl. No.: 537,815

[22] Filed: Jun. 14, 1990

[30] Foreign Application Priority Data

Jun. 15, 1989 [FR] France ............................ 89 07943

[51] Int. Cl.$^5$ ............................................. C04B 35/48
[52] U.S. Cl. ...................................... 501/105; 501/102
[58] Field of Search ............... 501/103, 104, 105, 102, 501/106

[56] References Cited

U.S. PATENT DOCUMENTS

| | | | |
|---|---|---|---|
| 3,541,193 | 11/1970 | Adams | 501/105 X |
| 3,632,359 | 1/1972 | Alper et al. | 501/105 X |
| 4,336,339 | 6/1982 | Okumiya et al. | 501/103 |
| 4,705,763 | 11/1987 | Hayashi et al. | 501/105 X |

*Primary Examiner*—William R. Dixon, Jr.
*Assistant Examiner*—Lisa Schull
*Attorney, Agent, or Firm*—Breiner & Breiner

[57] ABSTRACT

The invention relates to refractory materials.

It relates to a refractory product without cracks obtained by fusion under oxidizing conditions and cast from a mixture of starting materials such that the product obtained has the average chemical composition by weight, in % by weight based on the following oxides:

| | |
|---|---|
| $ZrO_2$ | >92 |
| $SiO_2$ | 2–6.5 |
| $Na_2O$ | 0.12–1.0 |
| $Al_2O_3$ | 0.4–1.15 |
| $Fe_2O_3 + TiO_2$ | <0.55 |
| $P_2O_5$ | <0.05. |

Use in the glassmaking sector.

2 Claims, 1 Drawing Sheet

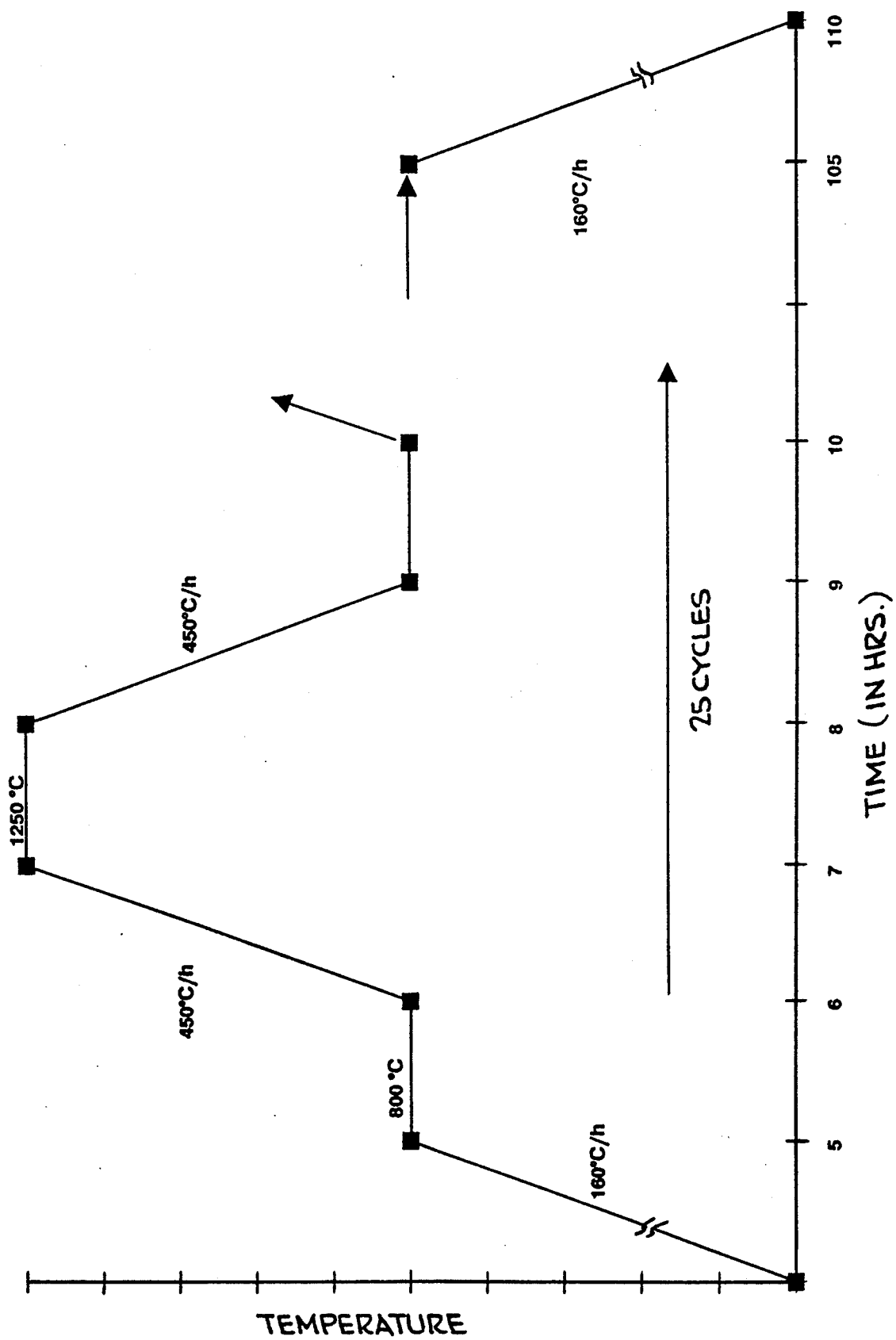

FUSED AND CAST REFRACTORY PRODUCTS HAVING A HIGH ZIRCONIUM DIOXIDE CONTENT

The invention relates to fused and cast refractory products having a high zirconium dioxide content.

The fused and cast products (frequently called electro-cast) consisting mainly of $Al_2O_3$, $ZrO_2$ (with a $ZrO_2$ content of between 32 and 42% by weight) and $SiO_2$ are well known for their corrosion resistance capacity in a large variety of applications in the field of glass fusion furnaces.

However, under certain conditions their use is limited; this is the case in the preferential wear zones in certain furnaces (for example the orifices) or in contact with some glasses which are highly aggressive for the refractories. They may also not be suitable because, in contact with some glasses, they are capable of causing flaws which adversely affect the quality of the glass produced. For example, their use is not optimum in contact with glasses containing zirconium dioxide (termed alkali-resistant glasses) because the alumina which they contain can, once dissolved in the glass, cause zirconium dioxide to crystallize therein and disturb the drawing out of fibres from this glass.

It is not always possible to make use of fused and cast products or of sintered products containing chromium oxide, either because the discoloration of the glass is undesirable or because their behaviour in contact with the glass under consideration is not in accordance with the objectives of improving the corrosion resistance or of improving the quality of the glass.

The use of fused and cast products obtained from a composition consisting mainly of zirconium dioxide ($ZrO_2 > 85\%$ by weight) can, in certain types of glass, make it possible to meet the demands for high corrosion resistance without discoloration of the glass produced and without the generation of flaws which adversely affect the quality of this glass.

However, during the production and the use of fused and cast products having a high zirconium dioxide content, the significant variations in the volume of the zirconium dioxide in the course of the reversible allotropic transformation (monoclinic phase to tetragonal phase) can give rise to significant mechanical strains leading to the cracking or even the fracture of blocks thus produced. In U.S. Pat. Nos. 3,519,448, 4,336,339 and 4,705,763, the authors have proposed the introduction of $SiO_2$ and other additional components to overcome this problem.

Thus, U.S. Pat. No. 3,519,448 proposes the incorporation of rare earth oxides to stabilize the zirconium dioxide.

In U.S. Pat. Nos. 4,336,339 and 4,705,763, phosphorus is put forward as an essential component enabling a soft vitreous phase to be obtained and a moulded product to be produced without fissures even with a low content of vitreous phase. U.S. Pat. No. 4,336,339 proposes, in particular, the introduction of 0.1 to 3% of phosphorus, expressed in the form of $P_2O_5$, into the final product, while U.S. Pat. No. 4,705,763 recommends the simultaneous introduction of 0.05 to 3% of phosphorus, expressed in the form of $P_2O_5$, and 0.05 to 5% of boric anhydride, expressed in the form of $B_2O_3$, to compensate for the fall in alkali metal elements kept below or equal to 0.1%. In this latter patent, the authors also indicate that for $ZrO_2$ contents of greater than or equal to 95% by weight at least 0.05% of phosphorus, expressed in the form of $P_2O_5$, is needed. In these two patents, the addition of phosphorus is, moreover, indicated as facilitating the fusion of the starting materials of the composition and enabling savings in fusion energy. In U.S. Pat. Nos. 4,336,339 and 4,705,763 phosphorus is therefore recommended either on its own or in combination with boric anhydride, expressed in the form of $B_2O_3$, but in all cases phosphorus is said to be necessary.

With regard to the alkali metal oxides, in particular $Na_2O$, a limit is placed only on their upper values in these two patents. In U.S. Pat. No. 4,336,339 the proportion by weight of $Na_2O$ must be less than 0.1%, in particular to prevent the electrical resistivity of the product being too low. In these two patents, the authors did not recognize $Na_2O$ as having a positive role which they adjudged necessary to fix a minimum value for introduction.

Moreover, FR-A-2478622 and 2587025 describe comparative examples ($P_4$ and $P_8$ in FR-A-2478622 and $P_3$ in FR-A-2587025) which are free from $P_2O_5$ and from $B_2O_3$ and which have compositions close enough to those of the products of the invention. However, it is indicated that the moulded articles obtained contain cracks.

The Applicant has now found that:

The use of phosphorus on its own or in combination with boric anhydride is not necessary to obtain blocks of fused and cast products containing more than 85% by weight of $ZrO_2$ which are free from fissures or cracks prejudicial to their use in contact with melting glass.

Phosphorus is not only not necessary for the production of sound blocks but in addition causes or amplifies an undesirable behaviour of the product during its industrial use and proves to be a troublesome component for good management of the process for production of the product.

It is necessary to introduce a minimum content of $Na_2O$ into the product in order to obtain a desirable behaviour of the refractory product during its industrial use. In fact, if $SiO_2$ is the element determining the amount of vitreous phase, $Na_2O$ is the element determining the quality of this phase.

It is necessary to fuse the charge of starting materials under oxidizing conditions in order to prevent the formation of fissures or cracking.

The present invention relates to a refractory product without cracks obtained by fusion under oxidizing conditions and cast from a mixture of starting materials such that the product obtained has the following average chemical composition by weight, in % by weight based on the oxides:

|  | Wide range | Preferred range |
| --- | --- | --- |
| $ZrO_2$ | >92 | >92 |
| $SiO_2$ | 2–6.5 | 3–6 |
| $Na_2O$ | 0.12–1.0 | 0.2–0.6 |
| $Al_2O_3$ | 0.4–1.15 | 0.4–1.0 |
| $Fe_2O_3 + TiO_2$ | <0.55 | <0.3 |
| $P_2O_5$ | <0.05 | <0.03 |

For an equal zirconium dioxide content, the products of the invention have a corrosion resistance in contact with the main glasses to be treated which is at least equivalent to that of commercial products containing added phosphorus in accordance with the teachings of U.S. Pat. Nos. 4,336,339 and 4,705,763.

The presence of $SiO_2$ in an amount of 2 to 6.5% by weight and preferably of 3 to 6% and the presence of $Al_2O_3$ in an amount of 0.4 to 1.15% by weight and preferably of 0.4 to 1.0% is necessary to enable the variations in volume of the zirconium dioxide during its allotropic transformation to be accommodated efficiently within an intergranular vitreous phase.

Too large an addition of $SiO_2$ has an adverse influence on the corrosion resistance. In fact, the increase in $SiO_2$ is made essentially to the detriment of $ZrO_2$, which is the resistant phase of the product. It is advantageous to keep the proportion of alumina at a value which does not exceed 1.15% by weight, preferably 1%, in order to minimize the risk of fissure formation.

The proportion of $Na_2O$ must be between 0.12 and 1.0% by weight, preferably between 0.2 and 0.6%.

$Fe_2O_3$ and $TiO_2$ may optionally be tolerated in a proportion not exceeding 0.55% by weight in total, preferably 0.3%.

Only traces, introduced as impurities, of other oxides (such as the alkaline earth metal oxides) may be present in the products of the invention. In particular, phosphorus is not deliberately introduced into the product of the invention. However, very small amounts of phosphorus originating from impurities present in the starting materials may be tolerated. In all cases, however, the phosphorus content by weight, calculated in the form of $P_2O_5$ must be kept below 500 ppm (0.05%), preferably below 300 ppm (0.03%), this content being, for an industrial production, a function of the quality of the starting materials used.

In fact, the Applicant has found that, during their industrial use, certain products having a high $ZrO_2$ content (85% by weight and more) undergo undesirable structural transformations which are caused or amplified by the presence of phosphorus.

These transformations are essentially associated with the formation of zircon by reaction between the $SiO_2$ of the vitreous phase and the grains of baddeleyite ($ZrO_2$) which make up the crystalline phase of the product. Tempering tests carried out on small samples heated homogeneously at various temperatures enable the approximate value of 800° C. to be determined as being the temperature from which the formation of zircon develops in a perceptible manner.

The formation of zircon is accompanied by a reduction in volume of the order of 20%, creating mechanical strains within the product which cause cracking. This phenomenon will be termed structural cracking in the text which follows. A phenomenon of this type can cause an increase in the corrosion of the product by penetration of fused glass through these cracks and the generation in the glass of flaws consisting of grains of baddeleyite surrounded by zircon detaching from the matrix of the product and being able adversely to affect the quality of the glass.

The formation of zircon and its adverse thermomechanical consequences is promoted and amplified by the inevitable variations in temperature to which an industrial furnace is subject because of the variations in load and possible reductions or interruptions in the course of a campaign followed by re-starts. In all of these cases, the variations in temperature, tend to promote the propagation of microcracking due to the contraction during the possible formation of zircon which is reflected by cracking at the macroscopic level. The opening of these cracks leads to an expansion or swelling of the product and possibly to a removal of $ZrO_2$ grains. This phenomenon has been reproduced, in particular, in laboratory corrosion tests where the samples of product to be tested were brought from ambient temperature to the test temperature and then brought back to ambient temperature: increases in volume of certain samples are then observed. During a corrosion test in a rotary furnace rotating at 6 revolutions/min, linear increases in dimensions of the order of 5%, accompanied by significant cracking, were found in certain samples after a test period of 3 weeks.

The sole FIGURE is a temperature vs. time plot of a heating cycle test to determine the structural cracking phenomena in a product of the invention.

As it has been observed that all of the products of the family of electro-fused products having a high $ZrO_2$ content do not behave in the same way in respect of structural cracking phenomena, a simple and rapid test was developed enabling the behaviour of given products of the family to be differentiated clearly relative to other products with respect to this property. The test involves a heating cycle of 25 cycles on samples 40 mm $\times$ 30 mm $\times$ 30 mm in size, the change in the temperatures of which as a function of time is plotted in the single FIGURE appended.

The conditions of this test enabled significant differences between the products to be revealed within a short period of time and in an indisputable manner. It should be mentioned that these conditions are not representative of a treatment which a product could undergo in industrial practice, but the result given by this test in terms of differentiation of the products correlates well with the observations made under industrial conditions or under more realistic test conditions.

Thus, this test enabled the harmful influence of phosphorus in the products containing it to be shown. In fact, the degree of increase in volume (dV/V) of the samples after testing shows that the increase in the phosphorus content, the other elements remaining in identical or similar concentrations, causes a significantly greater expansion; on observation under the microscope, it was confirmed that these same products have vitreous phases transformed to a greater extent by the formation of zircon than do the products without phosphorus.

The origin of this phenomenon certainly lies in the well-known role of zircon mineral-forming agent which is played by phosphorus partially dissolved in the vitreous phase in the form of $P_2O_3$.

In addition to promoting the structural transformation of the products under consideration, it has been found that phosphorus plays a negative role at the level of the content of metal or of reduced elements in these products.

In electric fusion furnaces containing graphite electrodes, which are used for the fusion of this product, the conditions for a good oxidation of the fused mass can be difficult to obtain, in particular for products having a high $ZrO_2$ content, which can lead to the presence of nodules having a metallic appearance in the products solidified after casting in a mould. The adverse consequences of the presence of metal in the products in contact with oxidized fused masses of glass are well known, in particular in respect of the formation of bubbles detrimental to the quality of the glass and to the corrosion resistance of the refractory product concerned.

In the case of the products which do not contain phosphorus (expressed in the form of $P_2O_5$, that is to say $P_2O_5 < 0.03\%$), while nodules of small diameter (10 μm) having a metallic appearance are present dispersed in the vitreous phase of the product, these nodules essentially consist of iron originating from the impurities contained in the starting materials.

The products containing phosphorus in the composition likewise have nodules of metallic appearance, which are essentially nodules having a different chemical analysis. The latter are intermetallic compounds of the metal (mainly iron)-phosphorus type, the stoichiometry of which is, for example, of the form $Fe_nP$ ($n = 1, 2$ or 3) in the case of iron.

With several samples it was observed that the presence of phosphorus in the product increased the total amount of nodules having a metallic appearance in the intercrystalline phase. In fact, it was found that a significant proportion (about 25%) of the phosphorus reacts with the iron to form phosphides and these results have been found for products prepared under different bath oxidation conditions and with different amounts of phosphorus introduced. Thus, all other things being equal (starting materials, preparation conditions), a product containing phosphorus contains a concentration of phase having a metallic appearance which is higher than that in a product which does not contain phosphorus, since a significant proportion of this element is found in reduced form combined with the metallic iron which is free in the product without phosphorus.

To reduce the formation of nodules having a metallic appearance to a minimum and also to prevent the formation of fissures or cracking in the final product, it is essential to carry out the fusion of the charge of starting materials under oxidizing conditions. A preferred means for achieving this consists in using the long arc fusion process described in French Patent No. 1208577 and its additions Nos. 75893 and 82310, the teachings of which are incorporated here by reference. Briefly, this process consists in using an electric arc furnace in which the arc jumps between the charge and at least one electrode at a distance from this charge and in adjusting the length of the arc so that its reducing action is reduced to the minimum, while maintaining an oxidizing atmosphere above the fusion bath and mixing the said bath, either by the action of the arc itself or, preferably, by bubbling an oxidizing gas (air or oxygen, for example) into the bath or by adding to the bath substances liberating oxygen, such as peroxides.

If the presence of $P_2O_5$ is detrimental to the use of such products in contact with fused masses of glass, it s also detrimental to the industrial production of the products under consideration proceeding well.

In fact, in the case of production of this type of refractories in an electric fusion furnace, phosphorus is able to combine with iron in the course of fusion to form iron phosphides, which have a density greater than that of the molten bath and which deposit by settling on the lining layer of the furnace. If these metallic phosphides come into contact with the metal vessel, the electric current can be exchanged between the molten bath and the vessel, creating hot spots which can cause its perforation. As these vessels are fitted with water cooling, the risks, during these fusions, then become very great.

During the fusion of the charges of starting materials, a substantial evolution of phosphorus is observed which condenses, forming phosphoric acid, on all of the cold metallic parts located above the fusing liquid; a corrosion, which can be significant, is then observed on all of these emergent parts. This corrosion then gives rise to additional expenditure on the maintenance of the installations, which is not negligible and is detrimental to their safety in operation.

Moreover, phosphorus ($P_2O_5$) is generally introduced either in the form of aluminium phosphate or in the form of Na phosphate. At the elevated preparation temperatures, a volatilization of one or the other of these forms is found, which can be estimated at about 90% by weight. At this level, the volatility cannot be totally reproducible in the atmosphere of an electric furnace and therefore gives rise to a non-reproducibilty of the chemical analyses of the finished product with regard, in particular, to the alumina and $Na_2O$ contents. However, it is essential to monitor the contents of these two components and in particular that of $Na_2O$.

In fact, $Na_2O$ plays the role of an inhibitor in the transformation reaction zirconium dioxide + silica zircon, a phenomenon demonstrated during the heat cycle tests described above.

The following non-limiting examples are given with the aim of illustrating the invention.

In these examples, the following starting materials were used:

zirconium dioxide of type CClO, sold by the Applicant, the average analysis of which is, in % by weight:

| | |
|---|---|
| $ZrO_2 + HfO_2$ | = 98.5 |
| $SiO_2$ | = 0.5 |
| $Na_2O$ | = 0.2 |
| $Al_2O_3$ | = 0.1 |
| $TiO_2$ | = 0.1 |
| $Fe_2O_3$ | = 0.05 |
| CaO | = 0.05 |
| $P_2O_5$ | = 0.04 |
| MgO | = 0.03 | in the form of particles having a medium diameter of 3.9 μm.

zircon sand containing 33% of silica.

Alumina of type AC44 sold by Société Péchiney and assaying 99.4% of $Al_2O_3$.

Na carbonate containing 58.5% of $Na_2O$.

EXAMPLES 1 TO 3 AND COMPARATIVE EXAMPLES A TO C

Small refractory blocks were prepared, the characteristics of which were as follows:

| | |
|---|---|
| Size | 200 □ 400 □ 150 mm. |
| Moulding | in a graphite mould |
| Annealing | in alumina. | fusion in a long arc furnace as described in French Patent No. 1 208 577 and its additions Nos. 75893 and 83310.

The following table gives the average chemical analyses of the various blocks:

| Examples | Chemical composition in % by weight | | | | | | |
|---|---|---|---|---|---|---|---|
| | $ZrO_2$ | $SiO_2$ | $Al_2O_3$ | $Na_2O$ | $TiO_2$ | $Fe_2O_3$ | $P_2O_5$ |
| 1 | 93.1 | 5.47 | 0.86 | 0.28 | 0.19 | 0.11 | <500 ppm |
| A | 94.6 | 4.1 | 0.69 | 0.2 | 0.2 | 0.1 | 0.12 |

-continued

| Ex-am-ples | Chemical composition in % by weight | | | | | | |
|---|---|---|---|---|---|---|---|
| | ZrO2 | SiO2 | Al2O3 | Na2O | TiO2 | Fe2O3 | P2O5 |
| 2 | 95.4 | 3.45 | 0.65 | 0.3 | 0.1 | 0.1 | <500 ppm |
| B | 95.2 | 3.55 | 0.55 | 0.3 | 0.1 | 0.1 | 0.19 |
| 3 | 92.6 | 5.29 | 1.11 | 0.66 | 0.17 | 0.17 | <500 ppm |
| C | 92.6 | 5.07 | 1.14 | 0.7 | 0.17 | 0.16 | 0.16 |

The feasibility results obtained for pairs of products which have similar chemical analyses except for phosphorus were compared. Comparisons between Examples 1 and A, 2 and B and 3 and C did not enable differences in terms of production quality of the blocks to be detected with regard to the castability of the molten liquid, the filling and the cracking of the blocks produced.

These results have been fully confirmed on blocks of 500×1100×300 mm.

EXAMPLES 4 TO 6 AND COMPARATIVE EXAMPLES D TO F

Samples of refractory products according to the invention (Examples 4 to 6) and refractory products (Examples D to F) falling outside the scope of the invention because of their clearly higher P2O5 content were subjected to the heat cycle test (25 cycles) described above. The samples (40×40×30 mm) were taken from blocks prepared by the operating method described for Examples 1-3 or from commercially available blocks (the case for Comparative Example F) at 40 mm from the bottom of the block and at 20 mm from a side face. These samples had the chemical compositions indicated in Table 1 below, which also gives the dV/V ratio.

TABLE 1

| Examples | ZrO2 | SiO2 | Na2O | TiO2 | Fe2O3 | Al2O3 | P2O5 | dV/V % |
|---|---|---|---|---|---|---|---|---|
| 4 | 96.62 | 2.38 | 0.26 | 0.16 | 0.08 | 0.5 | <500 ppm | 2.4 |
| D | 96.38 | 2.55 | 0.25 | 0.16 | 0.08 | 0.43 | 0.15 | 5.4 |
| 5 | 96.58 | 2.56 | 0.19 | 0.15 | 0.07 | 0.45 | <500 ppm | 2.8 |
| E | 96.25 | 2.73 | 0.16 | 0.17 | 0.08 | 0.53 | 0.08 | 8.4 |
| 6 | 94.75 | 3.72 | 0.28 | 0.18 | 0.08 | 0.99 | <500 ppm | 1.7 |
| F | 93.89 | 4.8 | 0.3 | 0.21 | 0.12 | 0.42 | 0.26 | 31.2 |

It is seen that the reduction in the P2O5 content very considerably improves the behaviour of the products during the heat cycle, greatly reducing their expansion.

EXAMPLE 7 AND COMPARATIVE EXAMPLE G

Two refractory products having the following compositions in % by weight:

| | ZrO2 | SiO2 | Na2O | TiO2 | Al2O3 | P2O5 | Fe2O3 |
|---|---|---|---|---|---|---|---|
| Example 7 | 96.39 | 2.70 | 0.23 | 0.10 | 0.50 | 0.03 | 0.05 |
| Example G | 94.26 | 4.65 | 0.26 | 0.15 | 0.35 | 0.26 | 0.08 | were prepared using the operating method described with reference to Examples 1 to 3 and a qualitative and quantitative determination was carried out of the free metallic iron, the nodules having a metallic appearance and the vitreous phase with regard to their Fe and P contents.

The results obtained are summarized in Table 2 below:

TABLE 2

| | Values in ppm | 7 | G |
|---|---|---|---|
| Fe | total iron content (expressed as Fe°) | 350 | 595 |
| P | total phosphorus content (expressed as P°) | 130 | 1135 |
| Fe° | ion content in the form of free metal | 75 | ≈0 |
| P | present in the nodules having a metallic appearance | 30 | 275 |
| P | oxidized dissolved in the vitreous phase (expressed as P°) | 100 | 860 |
| Fe | present in the nodules having a metallic appearance, bonded to P | 55 | 300 |
| Fe | oxidized dissolved in the vitreous phase (expressed as Fe°) | 220 | 295 |

Ex. 7: product according to the invention
Ex. G: product to which phosphorus was added It is seen that in the product containing 0.11% of phosphorus expressed in the form P° (that is to say 0.26% expressed as P2O5), 0.0275% of P° (which is 25% of the total amount of phosphorus) is found in the metallic phases, the remainder being dissolved in the vitreous phase in the form of P2O5. With regard to the sample having a very low phosphorus content, that is 0.013% expressed as P° (which is 0.03% expressed as P2O5), 0.003% of P° (which is about 25% of the total introduced) is concentrated in the metallic phase. Relative to the preceding case, the incidence on the amount of metallic phase is then lower since the total amount of phosphorus present in the product is much less.

EXAMPLES 8 TO 10 AND COMPARATIVE EXAMPLE H

These examples illustrate the influence of the relative proportions of SiO2 and of Na2O on the expansion of the refractory products during the heat cycle test described above.

To this end, various samples having similar chemical compositions but varying in their Na2O content were subjected to the said test. These chemical compositions are indicated in % by weight in Table 3 below, which also gives the dV/V ratio determined for each sample.

TABLE 3

| Examples | ZrO2 | SiO2 | Na2O | TiO2 | Fe2O3 | Al2O3 | P2O5 | dV/V % |
|---|---|---|---|---|---|---|---|---|
| H | 93.89 | 4.74 | 0.15 | 0.19 | 0.09 | 0.94 | <500 ppm | 15.8 |
| 8 | 94.3 | 4.54 | 0.32 | 0.15 | 0.07 | 0.62 | <500 ppm | 2.9 |

TABLE 3-continued

| Examples | ZrO$_2$ | SiO$_2$ | Na$_2$O | TiO$_2$ | Fe$_2$O$_3$ | Al$_2$O$_3$ | P$_2$O$_5$ | dV/V % |
|---|---|---|---|---|---|---|---|---|
| 9 | 93.92 | 4.6 | 0.46 | 0.14 | 0.08 | 0.8 | <500 ppm | 2.2 |
| 10 | 93.64 | 4.67 | 0.59 | 0.15 | 0.08 | 0.87 | <500 ppm | 0.9 |

It is seen that for the products containing about 4.5 to 4.7% of SiO$_2$, the minimum content of Na$_2$O to obtain an acceptable expansion, that is to say a dV/V ratio of less than 5%, can be estimated at about 0.20% by weight, a content of at least 0.30% by weight being preferable in order to restrict the expansion to 3%.

Moreover, it is preferable not to exceed a Na$_2$O content of 1% by weight and very particularly of 0.6% by weight. In fact, above 0.6% by weight, virtually no supplementary inhibition of the formation of zircon is observed and, moreover, there is a tendency for a slight deterioration in other properties, such as the resistance to corrosion by the fused glass.

In supplementary tests carried out on products having silica contents lower than those of Examples 8 to 10 it was found that the Na$_2$O content could fall to 0.12% without exceeding a maximum acceptable expansion of 5% for a silica content of 2% by weight.

It is evident from these tests that a significant parameter is less the total Na$_2$O content of the product but rather the Na$_2$O concentration in the vitreous phase of the product. It is therefore necessary to adjust the Na$_2$O content of the product, within the prescribed limits, as a function of the size of the vitreous phase and in particular of the SiO$_2$ content, relatively large proportions of Na$_2$O being suitable for use conjointly with relatively high proportions of silica, and relatively small proportions of Na$_2$O being suitable for use conjointly with relatively low proportions of silica. For example, it has been found that in order to limit the expansion of the product in the cycle test described above to a value of less than 3% a concentration by weight of Na$_2$O in the vitreous phase higher than about 5% is required.

EXAMPLES 11 TO 13 AND COMPARATIVE EXAMPLES I TO L

In these examples the behaviour of three products according to the invention and of four reference products with regard to corrosion by fused glasses was compared.

The corrosion test used was the dynamic corrosion test described by J. RECASENS, A. SEVIN and M. GARDIOL at the 8th International Glass Congress held in London on 1 to 6th July 1968.

The average chemical analyses of the products subjected to the test were as follows:

The test conditions (type of glass, time, temperature) and the results obtained, expressed in the form of a relative corrosion resistance index, taking the resistance of the product according to the invention as the basis, are summarized for each type of test in Table 4.

It is obvious that the embodiments described are merely examples and that they could be modified, in particular by substitution of equivalent techniques, without as a result going beyond the scope of the invention.

TABLE 4

| Type of glass | Temperature | Time | Product from example | Index |
|---|---|---|---|---|
| Borosilicate | 1600° C. | 51 hours | I | 97 |
|  | 1600° C. | 51 hours | 11 | 100 |
| Alkali-resistant | 1550° C. | 72 hours | J | 92 |
|  | 1550° C. | 72 hours | K | 89 |
|  | 1550° C. | 72 hours | 12 | 100 |
| Soda-lime | 1550° C. | 24 hours | L | 95 |
|  | 1550° C. | 24 hours | 12 | 100 |
| Soda-lime | 1550° C. | 48 hours | L | 93 |
|  | 1550° C. | 48 hours | 13 | 100 |

We claim:

1. A refractory product without cracks obtained by fusion under oxidizing conditions and cast from a mixture of starting materials whereby said product consists essentially of, as expressed on an oxide basis in percent by weight:

| ZrO$_2$ | >92 |
|---|---|
| SiO$_2$ | 2–6.5 |
| Na$_2$O | 0.12–1.0 |
| Al$_2$O$_3$ | 0.4–1.15 |
| Fe$_2$O$_3$ + TiO$_2$ | <0.55 |
| P$_2$O$_5$ | <0.05. |

2. A refractory product according to claim 1, whereby said product consists essentially of

| ZrO$_2$ | >92 |
|---|---|
| SiO$_2$ | 3–6 |
| Na$_2$O | 0.2–0.6 |
| Al$_2$O$_3$ | 0.4–1.0 |
| Fe$_2$O$_3$ + TiO$_2$ | <0.3 |
| P$_2$O$_5$ | <0.03. |

* * * * *

| Examples | SiO$_2$ | Al$_2$O$_3$ | Na$_2$O | P$_2$O$_5$ | B$_2$O$_3$ | TiO$_2$ | Fe$_2$O$_3$ | ZrO$_2$ |
|---|---|---|---|---|---|---|---|---|
| I | 5.22 | 1.37 | 0.42 | 0.11 | 0.11 | 0.11 | 0.10 | 92.56 |
| J | 3.38 | 0.28 | 0.19 | 0.20 | 0.014 | 0.16 | 0.10 | 95.67 |
| K | 4.30 | 0.65 | 0.28 | 0.01 | 0.15 | 0.12 | 0.07 | 94.42 |
| L | 5.03 | 0.80 | 0.36 | 0.32 | traces | 0.27 | 0.14 | 93.08 |
| 11 | 3.45 | 0.65 | 0.30 | 0.01 | traces | 0.16 | 0.08 | 95.35 |
| 12 | 4.96 | 0.61 | 0.39 | 0.01 | traces | 0.18 | 0.11 | 93.74 |
| 13 | 5.08 | 0.90 | 0.31 | 0.01 | traces | 0.19 | 0.15 | 93.96 |